though of course, insofar as the present invention is concerned, the tool box itself forms no part of the invention.

United States Patent [19]
Smith-Williams

[11] 4,384,663
[45] May 24, 1983

[54] MOUNTING BRACKETS FOR TRAILER TOOL BOX

[76] Inventor: Margie M. Smith-Williams, 7929 Stewart & Gray #10, Downey, Calif. 90241

[21] Appl. No.: 287,494

[22] Filed: Jul. 27, 1981

[51] Int. Cl.³ .................................................. B60R 11/06
[52] U.S. Cl. .............................. 224/42.31; 224/42.43; 224/42.45 R; 280/152 R; 280/769; 296/37.1
[58] Field of Search ............... 224/42.07, 42.31, 42.43, 224/42.45 R, 42.46 R; 280/769, 154, 152 R, 152 B; 296/37.1, 37.3, 37.6, 24 R, 24 A; 248/201, 248/342, 250, 48.2

[56] References Cited
U.S. PATENT DOCUMENTS

| | | | |
|---|---|---|---|
| 2,699,966 | 1/1955 | Moon | 296/37.6 |
| 2,722,352 | 11/1955 | Dehnel | 296/24 R |
| 3,731,831 | 5/1973 | Huff | 296/37.6 X |
| 4,074,786 | 2/1978 | Joubert | 296/37.1 X |
| 4,126,349 | 11/1978 | Nelson et al. | 296/24 R |

FOREIGN PATENT DOCUMENTS

625877 5/1927 France ............................ 224/42.43

Primary Examiner—William T. Dixson, Jr.
Assistant Examiner—Gary E. Elkins
Attorney, Agent, or Firm—Keith D. Beecher

[57] ABSTRACT

Brackets are provided for mounting a tool box over the wheel of a trailer in place of the fender. The brackets are intended to be attached to the fender support mounts, or to any bracket secured to the frame of the trailer. They are configured to support the tool box with the tool box being bolted at each end to the respective brackets. The brackets have a feature in that identical brackets can be used in each pair without any need for making a different bracket for each end of the tool box, and also in that the brackets of each pair can be spaced to accommodate different sized tool boxes. Moreover, the brackets themselves may serve as containers is so desired.

7 Claims, 3 Drawing Figures

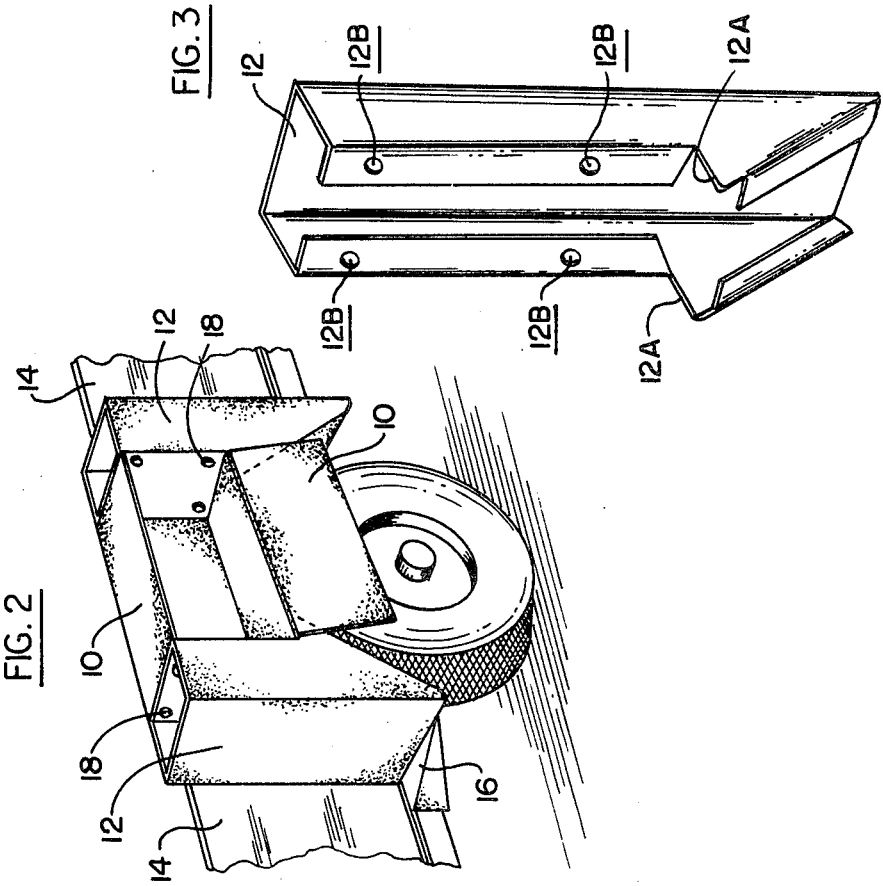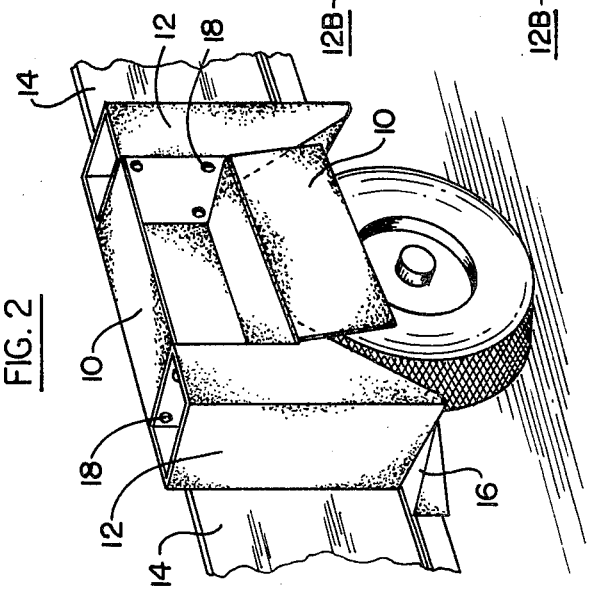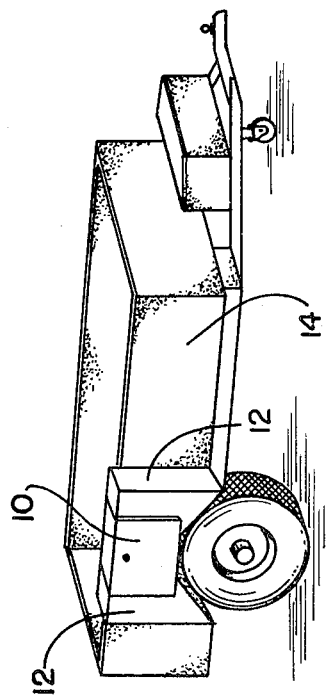

MOUNTING BRACKETS FOR TRAILER TOOL BOX

BACKGROUND

Trailer tool boxes are often loaded with many heavy tools and parts, and hence become a significant weight factor on the trailer. Fender tool boxes are known to the trailer art, and they permit the application of the weight at a point where it is most efficiently carried, that is, at the axle of the trailer. Such fender tool boxes are configured so that they may be welded over the trailer wheels, usually after the fenders have been removed, thus taking the place of the fenders.

An objective of the present invention is to provide inexpensive and sturdy brackets which may be welded, or otherwise attached, to the fender mounts, in place of the fenders. The support brackets of the invention are constructed to support standard tool boxes in a variety of sizes, merely by mounting the brackets on the trailer on opposite sides of a wheel of the trailer and at a particular distance from one another to receive a standard tool box, and by then bolting the tool box at its ends to the brackets. The use of standard tool boxes, reduces the overall cost of the custom fabricated fender boxes.

A pair of the aforesaid brackets is used for each tool box, with one bracket at each end of the box. Almost any tool box 22"-26" in length, or even longer, for example, may be supported between the brackets. All that is necessary is to remove the trailer fender (if one is in place) and weld the brackets to the fender mounts on either side of a corresponding wheel and at a spacing corresponding to the length of the tool box to be supported therebetween. The tool box is then placed on the brackets and it is bolted to the brackets, as will be described. Because the tool box is bolted to the brackets, it can be removed at any time for other uses. In fact, the tool box may be installed with quick-release latches, for convenient transportation of the tool box, which may subsequently be removed and carried to the actual job site.

BRIEF DESCRIPTION OF THE DRAWING

FIG. 1 is a perspective representation showing a trailer with a tool box supported over one of its wheels by brackets embodying the concepts of the present invention;

FIG. 2 is a further view of the tool box and support brackets of FIG. 1, with the cover of the tool box open and also showing the manner in which the support brackets are welded to the fender mounts of the trailer; and FIG. 3 is a perspective representation of one possible configuration of a support bracket constructed in accordance with the teaching of the present invention.

DETAILED DESCRIPTION OF THE ILLUSTRATED EMBODIMENT

As shown in FIGS. 1 and 2, a tool box 10 is supported on a pair of brackets 12, over a wheel of a trailer 14. Each of the brackets 12 is welded to a corresponding fender mount, such as the mount 16 shown in FIG. 2, and to the frame of the trailer, and the brackets are spaced apart a selected distance corresponding to the length of the tool box 10 to be supported therebetween. The tool box 10 is supported on shoulders 12A of the bracket (FIG. 3), and is held in place by bolts, such as bolts 18 extending through each end of the tool box.

The bolts 18 extend through the ends of the tool box and through holes 12B in the brackets (FIG. 3). As shown in FIGS. 1-3, of the drawing, the lower end of each of the brackets 12 is tapered to circumscribe the wheel of the trailer, and to form a fender for the wheel.

The invention provides therefore, support brackets for mounting fender tool boxes in a trailer, which are relatively simple and inexpensive to construct, and which may be mounted in an expeditious manner on the trailer.

It will be appreciated that while a particular embodiment of the invention has been shown and described, other configurations of the bracket 12 may be used to perform its intended function. Accordingly, all embodiments of the invention which are believed to fall within the spirit and scope of the invention are intended to be covered in the following claims.

What is claimed is:

1. A bracket for use with a like bracket for mounting a rectangular shaped tool box over the wheel of a vehicle, such as a trailer or the like, to which the bracket is attached, said bracket having an upper portion of a rectangular configuration with inwardly extending sections at each side thereof forming an abutting surface against the corresponding end of the tool box, and said bracket having a lower portion forming an intermediate lateral shoulder at the lower end of said upper portion for supporting the tool box, and said lower portion having sides tapered towards the bottom thereof for receiving the wheel of the vehicle, so that the brackets and the tool box may form a fender for the vehicle and so that the brackets may serve to support a variety of tool boxes of different sizes.

2. The bracket defined in claim 1, in which the bracket is formed of sheet metal, and said inwardly extending sections are in the form of flanges.

3. The bracket defined in claim 2, in which said flanges have holes therein to permit the tool box to be bolted to the bracket.

4. In combination: a wheeled vehicle and a pair of like brackets for mounting a tool box over the wheel of the vehicle with the brackets and the tool box forming a fender for the wheel, each of the brackets having an upper portion of a rectangular configuration with inwardly extending sections at each side thereof forming an abutting surface against the corresponding end of the tool box, and with each of said brackets having a lower portion forming an intermediate lateral shoulder at the lower end of said upper portion for supporting the tool box, and having sides tapered towards the bottom thereof for receiving the wheel of the vehicle, so that the brackets may serve to support a variety of tool boxes of different sizes.

5. The combination defined in claim 4, in which each of said brackets is formed of sheet metal, and said inwardly extending sections are in the form of flanges.

6. The combination defined in claim 4, in which said flanges have holes therein to permit the tool box to be bolted to the bracket.

7. The combination defined in claim 4, in which the vehicle includes fender mounts mounted thereto on either side of the wheel, and in which the bottom of each of the brackets is welded to a corresponding one of the fender mounts.

* * * * *